Patented Jan. 23, 1951

2,538,857

UNITED STATES PATENT OFFICE 2,538,857

COATING COMPOSITIONS

Raymond A. Barkhuff, Jr., Springfield, Mass., assignor to Monsanto Chemical Company, St. Louis, Mo., a corporation of Delaware No Drawing. Application September 6, 1945, Serial No. 614,813

4 Claims. (Cl. 260—97)

This invention relates to coating compositions. More particularly the invention relates to coating compositions based on thiophene-aldehyde condensation products.

An object of this invention is to provide a coating composition.

A further object is to provide a coating composition containing thiophene-aldehyde condensation products.

Another object is to provide a coating composition that is resistant to chemical action.

These and other objects are attained by condensing thiophene with an aldehyde and using the product as a coating material or as a base for a coating material.

The following examples are given in illustration and are not intended as limitations on the scope of the invention. Where parts are mentioned they are parts by weight.

Example I

A mixture comprising 84 parts of thiophene, 105 parts of formalin (37% formaldehyde), 1 part of 2-ethyl hexanol and 4 parts of sulfuric acid was reacted under 20-25 p. s. i. pressure at 100-105° C. for 3 hours. The product was then cooled, neutralized by the addition of 5 parts of lime, and dehydrated under vacuum and then filtered to remove insoluble impurities. The product was a stable syrup soluble in various organic solvents such as carbon disulfide, acetone, benzyl alcohol, ethylene dichloride, chloroform, trichloroethane, dioxane, methyl cellosolve, thiophene, acetic anhydride, methyl isobutyl ketone, furfural, allyl alcohol and ethyl acetate. It was only slightly soluble in carbon tetrachloride, n-butyl acetate, toluene, xylene, benzene, methanol and ethanol and insoluble in water, ether and ethylene glycol.

To the syrup was added a catalytic amount of ethyl phosphoric acid. This mixture could be coated on various surfaces such as metal, wood, glass, etc. and cured to an insoluble, infusible film having high chemical resistance and being impermeable to water. The syrup may be applied as obtained from the dehydration step or it may be dissolved in a volatile solvent before application to the surface to be coated.

The amount and type of aldehyde used may be varied within wide limits. For example, from about 80 to 150 parts of formalin may be employed and the formalin may be replaced, entirely or in part, by other aldehydes such as acetaldehyde, propionaldehyde, butyraldehyde, acrolein, crotonaldehyde, benzaldehyde, cinnamaldehyde, etc.

2-ethyl hexanol was used as a wetting agent. It may be left out of the reaction mixture or substituted by other wetting agents. The amount of wetting agent may be varied as desired to obtain optimum reaction conditions. In the preferred process of this invention a wetting agent, particularly 2-ethyl hexanol, is used in amounts ranging from 0.5 to 6 parts per 100 parts of thiophene.

Sulfuric acid is shown as a condensation catalyst. It may be replaced by other acidic condensation catalysts such as hydrochloric acid, phosphoric acid, oxalic acid, etc. The amount of acid catalyst used affects the rate of reaction and may be varied widely within the bounds of practical reaction control. As little as 2 parts will effectively catalyze the reaction while as much as 10 parts may be used without increasing the reaction rate beyond effective control.

Lime is shown as a neutralizing or stabilizing agent for the syrup. Other alkaline reacting materials may be used in quantities sufficient to raise the pH of the syrup to at least 7, such as alkalies, quaternary ammonium bases, alkaline reacting salts, ammonia, organic amines, etc.

In the neutral or alkaline state, the syrup is stable and may be stored indefinitely without deteriorating. To use the syrup as a coating composition, a catalytic amount of an acid or acid reacting salt is added, for example, ethyl phosphoric acid, sulfuric, hydrochloric, phosphoric, oxalic, acetic, lactic and benzoic acids, zinc chloride, ferric chloride, titanium sulfate, anhydrous aluminum chloride, and sodium acid sulfate. The composition may then be applied and cured by heating at 100–180° C.

The resultant coatings are resistant to moisture and most chemical reagents and have particularly high resistance to alkalies.

Example II 84 parts of thiophene were mixed with 90 parts of crotonaldehyde, 2 parts of phosphoric acid and 2 parts of octyl alcohol and the mixture reacted at 100–105° C. under a pressure of 20–25 p. s. i. The product was cooled, neutralized with 4 parts of lime and dehydrated to yield dark colored syrup. The syrup could be used without further modification since it was found that it could be cured at 100–180° C. to an insoluble, infusible condition without the addition of catalysts. If, however, low temperature baking coatings are desired, the acid catalysts disclosed above may be added.

The syrups shown in Example I and II may be considered as base syrups for use in making numerous types of coating compositions. They may be modified by the conventional materials used in lacquers or coatings such as pigments, fillers, dyes, etc.

The base syrups may also be used to modify heat reactive oils. The modified oils alone, or when compounded with solvents, driers, pigments, fillers, dyes, etc., may be used as coating compositions. The coatings thus produced have excellent alkali and moisture resistance.

*Example III*

1 part of thiophene-formaldehyde base syrup as shown in Example I was mixed with 1 part of tung oil and 1 part of bodied linseed oil and the mixture was heated at 265–271° C. for about 1½ hours. The resultant product was cured as a thin film at 150° C. in 2 hours without the use of a drier. When .025% (based on the oil) of a cobalt drier was added to the modified oil, it dried to a hard, smooth film in 15 minutes at 150° C.

*Example IV*

1 part of thiophene-crotonaldehyde base syrup as shown in Example II was mixed with 2 parts of tung oil and the mixture heated at 267–270° C. for about 1 hour. The product could be dried to a hard film in 2 hours at 150° C. without the addition of a drier. If a small proportion of drier was added, the curing time at 150° C. was reduced to 15 minutes.

Cured films made by the processes shown in Examples III and IV were dark colored, tough and showed good resistance to moisture and alkali.

The proportions of base syrup to oil or oil mixture may be varied considerably according to the results desired. The temperature of the modifying reaction may be varied between about 200–300° C., the preferred range being between 240 and 270° C.

As shown in the examples the oils modified with thiophene-aldehyde syrups may be cured to a hard, insoluble product without the addition of driers but such an addition materially reduces the curing time. Any of the conventional driers or mixtures of driers may be used, such as cobalt, lead and manganese driers and mixtures thereof.

The base syrups shown in Examples I and II may further be used to modify natural and synthetic unsaturated resins and the products used to modify heat reactive oils.

*Example V*

1 part of a thiophene-aldehyde syrup was reacted with 2 parts of colophony at 250° C. for 1 hour. The acid number of the rosin was reduced from over 110 to less than 90. One part of the modified rosin was then reacted with 2 parts of a tung oil at 248–270° C. for about 1 hour. The resulting modified oil could be cured in a thin film in about 2 hours at 150° C. without the addition of a drier and in about 15 minutes if a small amount of drier was incorporated in the modified oil. The cured films were tough, hard and had excellent resistance to moisture, alkali and acid.

*Example VI*

Two parts of ester gum were reacted with 1 part of a thiophene-aldehyde syrup as shown in Example I at 250° C. for about 1 hour. 1 part of the product was then mixed with 2 parts of tung oil and the mixture heated at 267° C. for less than half an hour. The product could be cured in a thin film to a dry, hard, infusible coating at 150° C. in about 2 hours without the addition of a drier and in about 15 minutes when a small proportion of a conventional drier was added.

*Example VII*

One part of a thiophene-aldehyde syrup was reacted with 1 part of rosin at 250° C. for 1 hour. 1 part of resultant modified rosin was used to modify 2 parts of tung oil at 250–270° C. for 2 hours. The modified oil could be hardened in a thin film at 150° C. in about 2 hours without the use of a drier and in about 15 minutes with the addition of a small amount of a conventional drier. Resultant films showed excellent resistance to moisture, alkalies and acids.

In modifying the resins with the thiophene-aldehyde syrup, the proportions may be varied between about 1 part of thiophene syrup to about 2 parts of resin and about 3 parts of thiophene syrup to about 1 part of resin. The products of the reaction are substantially lower in acid number than the unmodified resin and may be used to modify heat reactive oils to obtain fast curing coating compositions resistant to alkali, acid and moisture.

The resins which may be modified by the thiophene-aldehyde condensation products are acidic, unsaturated natural and synthetic resins such as rosin, dammar, copal, kauri, ester gum, alkyd resins, etc.

The heat-reactive oils which can be modified by the processes shown in Examples III through VII are oils generally classed as drying or semi-drying oils. Among the oils which may be modified by the thiophene-aldehyde and thiophene-aldehyde-resin products are linseed oil, tung oil, soyabean oil, perilla oil, sunflower oil, safflower oil, poppy seed oil, walnut oil, oiticica oil, dehydrated castor oils or a combination of two or more of the above oils.

The thiophene-aldehyde condensation products of this invention may be further modified by the admixture of compatible synthetic resins such as vinyl resins, e. g., polyvinyl esters, polyvinyl acetals, polystyrene, polyvinyl ethers, acrylic resins, e. g., polyacrylic acids and their esters, nitriles and amides, vinyl copolymers including copolymers of vinyl and acrylic compounds with dienes, e. g., copolymers of styrene or acrylonitrile with butadiene.

The coating compositions of this invention are particularly useful in providing tough, moisture and chemical resistant coatings.

The foregoing description is illustrative and not limitative of this invention as defined in the appended claims.

What is claimed is:

1. A coating composition comprising a heat-reactive oil modified by a condensation product of thiophene and an aldehyde, said composition having been prepared by reacting 100 parts of thiophene with 30 to 90 parts of an aldehyde for about 3 hours at 100–105° C. under a pressure of 20–25 p. s. i. in the presence of from 2 to 10 parts of an acid condensation catalyst and thereafter reacting said condensation product with a heat-reactive oil at 200–300° C.

2. A coating composition as in claim 1 wherein the heat-reactive oil is tung oil and the aldehyde is formaldehyde.

3. A coating composition comprising a heat-reactive oil modified by the reaction product of an unsaturated resin and a condensation product of thiophene and an aldehyde, said composition having been prepared by reacting 100 parts of thiophene with 30 to 90 parts of an aldehyde for about 3 hours at 100–105° C. under a pressure of 20–25 p. s. i. in the presence of from 2 to 10 parts of an acid condensation catalyst, reacting said condensation product with an unsaturated resin at about 250° C. and then reacting the product with a heat-reactive oil at 200–300° C.

4. A coating composition as in claim 3 wherein the unsaturated resin is rosin.

RAYMOND A. BARKHUFF, JR.

REFERENCES CITED

The following references are of record in the file of this patent:

UNITED STATES PATENTS

| Number | Name | Date |
|---|---|---|
| 2,114,121 | Bender | Apr. 12, 1938 |
| 2,425,721 | Blicke | Aug. 19, 1947 |
| 2,453,085 | Caesar | Nov. 2, 1948 |

FOREIGN PATENTS

| Number | Country | Date |
|---|---|---|
| 109,201 | Australia | Nov. 24, 1939 |

OTHER REFERENCES

Berichte, vol. 17, pp. 1341–1342 (1884).
Berichte, vol. 29, pp. 2205–2207 (1896).